(12) United States Patent
Scott et al.

(10) Patent No.: US 7,678,459 B2
(45) Date of Patent: *Mar. 16, 2010

(54) FIRST SURFACE MIRROR WITH SILICON-METAL OXIDE NUCLEATION LAYER

(75) Inventors: Gregory Scott, Shelby Township, MI (US); Yiwei Lu, Ann Arbor, MI (US); Leonard L. Boyer, Jr., Flat Rock, MI (US); Brent Boyce, Novi, MI (US); Donald V. Jacobson, Saline, MI (US); Francis Wuillaume, Plymouth, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 388 days.

This patent is subject to a terminal disclaimer.

(21) Appl. No.: 11/657,120

(22) Filed: Jan. 24, 2007

(65) Prior Publication Data

US 2007/0243355 A1 Oct. 18, 2007

Related U.S. Application Data

(63) Continuation-in-part of application No. 10/945,430, filed on Sep. 21, 2004, now Pat. No. 7,276,289.

(51) Int. Cl.
*B32B 17/06* (2006.01)
*G02B 5/08* (2006.01)

(52) U.S. Cl. .................. 428/432; 428/448; 428/697; 428/912.2; 428/699; 428/701; 359/883; 359/884

(58) Field of Classification Search .......... None
See application file for complete search history.

(56) References Cited

U.S. PATENT DOCUMENTS

| | | | |
|---|---|---|---|
| 4,101,707 A | 7/1978 | Henry | |
| 4,255,214 A | 3/1981 | Workens | |
| 4,309,075 A | 1/1982 | Apfel et al. | |
| 4,780,372 A | 10/1988 | Tracy et al. | |
| 5,669,681 A | 9/1997 | Ishikawa et al. | |
| 5,896,236 A | 4/1999 | Lostumo et al. | |
| 5,923,464 A | 7/1999 | Braun | |
| 5,930,046 A | 7/1999 | Solberg et al. | |
| 5,939,201 A | 8/1999 | Boire et al. | |
| 5,976,683 A | 11/1999 | Liehr et al. | |
| 6,275,272 B1 | 8/2001 | Park | |
| 6,495,263 B2 | 12/2002 | Stachowiak | |
| 6,543,903 B2 | 4/2003 | Akimoto et al. | |
| 6,544,716 B1 | 4/2003 | Hajjar et al. | |
| 6,586,102 B1 | 7/2003 | Stachowiak | |
| 6,602,608 B2 | 8/2003 | Stachowiak | |
| 6,686,050 B2 | 2/2004 | Lingle | |
| 6,783,253 B2 | 8/2004 | Thomsen et al. | |

(Continued)

OTHER PUBLICATIONS

U.S. Appl. No. 10/945,430, filed Sep. 21, 2004.

*Primary Examiner*—Ling Xu
(74) *Attorney, Agent, or Firm*—Nixon & Vanderhye P.C.

(57) ABSTRACT

A first surface mirror includes a reflective layer and one or more dielectric layers. In certain example embodiments, a silicon metal oxide (e.g., silicon aluminum oxide) inclusive nucleation layer(s) is provided above and/or below the reflective layer in order to improve durability of the first surface mirror.

23 Claims, 5 Drawing Sheets

U.S. PATENT DOCUMENTS

| | | |
|---|---|---|
| 6,934,085 B2 | 8/2005 | Stachowiak et al. |
| 2002/0076564 A1 | 6/2002 | Reichert et al. |
| 2006/0063010 A1 | 3/2006 | Lu et al. |
| 2006/0077580 A1 | 4/2006 | Wuillaume et al. |

FIRST SURFACE MIRROR WITH SILICON-METAL OXIDE NUCLEATION LAYER

This application is a continuation-in-part (CIP) of U.S. Ser. No. 10/945,430, filed Sep. 21, 2004, now U,S, Pat. No. 7,276,289, the entire disclosure of which is hereby incorporated herein by reference.

In certain example embodiments of this invention, a mirror includes a nucleation layer between a substrate (e.g., glass substrate, or any other suitable material) and a reflective layer (e.g., Al layer, or of any other suitable reflective material), the nucleation layer containing a mixture of certain materials found in the substrate and reflective layer (e.g., silicon oxide from the glass and Al from the reflective layer). Certain example embodiments of this invention relate to a first-surface mirror including a silicon metal oxide (e.g., silicon aluminum oxide) nucleation layer provided at least between the glass substrate and the reflective layer(s) (e.g., Al layer) of the mirror. In certain example embodiments, such first surface mirrors may be used in the context of a projection television (PTV) apparatus, or any other suitable application.

BACKGROUND AND SUMMARY OF EXAMPLE EMBODIMENTS OF THE INVENTION

Mirrors for various uses are known in the art. For example, see U.S. Pat. Nos. 5,923,464 and 4,309,075 (all hereby incorporated herein by reference). Mirrors are also known for use in projection televisions and other suitable applications. In the projection television context, see for example U.S. Pat. Nos. 6,275,272, 5,669,681 and 5,896,236 (all hereby incorporated herein by reference).

One type of mirror is a second or back surface mirror (most common), while another type of mirror is a first or front surface mirror (less common). Back surface mirrors typically include a glass substrate with a reflective coating on a back surface thereof (i.e., not on the front surface which is first hit by incoming light). Incoming light passes through the glass substrate before being reflected by the coating in a second surface mirror. Thus, reflected light passes through the glass substrate twice in back or second surface mirrors; once before being reflected and again after being reflected on its way to a viewer. In certain instances, passing through the glass substrate twice can create ambiguity in directional reflection and imperfect reflections may sometimes result. Mirrors such as bathroom mirrors, bedroom mirrors, and architectural mirrors are typically back or second surface mirrors so that the glass substrate can be used to protect the reflective coating provided on the rear surface thereof.

In applications where more accurate reflections are desired, front (or first) surface mirrors are often used. In front/first surface mirrors, a reflective coating provided on the front surface of the glass substrate so that incoming light is reflected by the coating before it passes through the glass substrate (e.g., see FIG. 1). Since the light to be reflected does not have to pass through the glass substrate in first surface mirrors (in contrast to rear surface mirrors), first surface mirrors generally have higher reflectance than do rear surface mirrors, and no double reflected image. Example front surface mirrors (or first surface mirrors) are disclosed in U.S. Pat. Nos. 5,923,464 and 4,780,372 (both incorporated herein by reference).

Many first surface mirror reflective coatings include a dielectric layer(s) provided on the glass substrate over a reflective layer (e.g., Al or Ag). Unfortunately, when the coating becomes scratched or damaged in a front surface mirror, this affects reflectivity in an undesirable manner as light must pass through the scratched or damaged layer(s) twice before reaching the viewer (this is not the case in back/rear surface mirrors where the reflective layer is protected by the glass). Coatings typically used in this regard are not very durable, and are easily scratched or otherwise damaged leading to reflectivity problems. Thus, it can be seen that front/first surface mirrors are very sensitive to scratching. Other possible cosmetic problems associated with first surface mirrors include pinhole formations, corrosion, adhesion, and/or reflectivity level.

For example, prior art FIG. 1 of the instant application illustrates a first surface mirror including glass/Al/SiO$_2$/TiO$_2$, where the aluminum (Al) reflective layer is deposited directly onto the glass substrate. Such mirrors suffer from problems such as poor adhesion, pinholes, poor scratch and abrasion resistance, and other durability and cosmetic problems. These durability problems are particularly evident when float glass (soda lime silica glass) is used as the substrate.

Unfortunately, the durability of first surface mirrors as shown in FIG. 1 is problematic. There is poor adhesion between the metal layer (Al) and the glass substrate. If a metal layer such as Cr is added below the Al between the Al and the glass substrate, corrosion of metal(s) tends to be caused by electrochemical reactions due to the flow of electrons among metals having different free energy if a multiple-layered metal (e.g., Cr/Al) is used to improve metal/glass adhesion. Thus, such first surface mirrors suffer from yield loss on mechanical durability tests due to the delamination of Al from the glass and/or silicon oxide. In a situation where a metal layer such as Cr is added below the Al, between the Al and the glass substrate, delamination of the coating from the glass is improved but the product sometimes fails the salt fog test due to metal corrosion. Thus, it will be appreciated that poor bonding between the reflective metal layer and the substrate can cause failure such as large area delamination, or degraded optical performance such as reflection loss caused by pinholes and/or bulges. This poor bonding is caused by the sharp interface caused by the different categories of adjacent materials such as reflective metal on glass.

It will be apparent from the above that there exists a need in the art for a first/front surface mirror that is less susceptible to scratching, corrosion, pinhole formations, and/or the like.

Instead of a sharp interface between two different materials (e.g., Al and glass), a bonding layer is provided between the reflective layer and the substrate (e.g., glass or plastic substrate) in certain example embodiments of this invention. The bonding or nucleation layer may be of or include elements from both the reflective layer (e.g., Al or the like) and the substrate (e.g., silicon oxide or the like), in order to mitigate the sharp interface between the substrate and reflective layer. In certain instances, the transition can be further smeared by having the composition of the nucleation layer change (e.g., continuously or non-continuously) so as to be graded, so that the nucleation layer is rich in the reflective element close to the reflective layer and rich in the substrate element(s) close to the substrate.

In certain embodiments of this invention, a silicon metal oxide (e.g., silicon aluminum oxide) inclusive nucleation layer is provided under the reflective layer (e.g., Al layer). It has surprisingly been found that providing such a nucleation layer immediately under and contacting the reflecting layer significantly improves durability of the resulting first surface mirror, and the overall optical performance of the mirror. The silicon metal oxide inclusive layer is a good nucleation layer for the reflective material such as aluminum (Al). In certain example embodiments, the metal in the silicon metal oxide nucleation layer is the same metal as in the reflective layer (e.g., Al is in both the reflective Al layer and the silicon aluminum oxide inclusive nucleation layer), thereby improving durability.

Such a silicon metal oxide inclusive nucleation layer may be provided above and/or below the reflective layer in certain embodiments of this invention to improve adhesion above and/or below the reflective layer.

It has unexpectedly been found that the use of such a silicon metal (e.g., Al) oxide nucleation layer above and/or below the reflective layer significantly improves durability of the resulting first surface mirror, with respect to reducing delamination and/or corrosion.

In certain example embodiments of this invention, such first surface mirrors may be used in projection televisions, copiers, scanners, bar code readers, vehicle mirrors, overhead projectors, and/or any other suitable applications.

In certain example embodiments of this invention, there is provided a mirror comprising a substrate supporting a coating, wherein the coating includes at least a reflective layer comprising aluminum, first and second dielectric layers, and at least one layer comprising silicon aluminum oxide, wherein the layer comprising silicon aluminum oxide is located closer to the substrate than are the reflective layer and the dielectric layers, and wherein the reflective layer comprising aluminum is located between the substrate and the dielectric layers; wherein the layer comprising silicon aluminum oxide is located directly under and contacting the reflective layer comprising aluminum in order to improve at least durability of the first surface mirror; and wherein the layer comprising silicon aluminum oxide is graded in at least three different respects so that the layer comprising silicon aluminum oxide (a) contains more oxygen at a location closer to the substrate than at a location further from the substrate; (b) contains more Si at a location closer to the substrate than at a location further from the substrate; and (c) contains more Al at a location closer to the reflective layer than at a location further from the reflective layer.

In other example embodiments of this invention, there is provided a first surface mirror comprising a substrate supporting a coating, wherein the coating includes at least a reflective layer, first and second dielectric layers, and at least one layer comprising silicon aluminum oxide, wherein the layer comprising silicon aluminum oxide is located closer to the substrate than are the reflective layer and the dielectric layers, and wherein the reflective layer is located between the substrate and the dielectric layers; wherein the layer comprising silicon aluminum oxide is located directly under and contacting the reflective layer in order to improve at least durability of the first surface mirror; and wherein the layer comprising silicon aluminum oxide is graded in at least two of the following three different respects: (a) the layer comprising silicon aluminum oxide comprises more oxygen at a location closer to the substrate than at a location further from the substrate; (b) the layer comprising silicon aluminum oxide comprises more Si at a location closer to the substrate than at a location further from the substrate; and (c) the layer comprising silicon aluminum oxide comprises more Al at a location closer to the reflective layer than at a location further from the reflective layer.

In other example embodiments of this invention, there is provided a first surface mirror comprising: a substrate supporting a coating, wherein the coating includes at least a reflective layer, at least one dielectric layer, and at least one layer comprising silicon aluminum oxide, wherein the layer comprising silicon aluminum oxide is located closer to the substrate than are any of the reflective layer and the dielectric layer, and wherein the reflective layer is located between the substrate and the dielectric layer; wherein the layer comprising silicon aluminum oxide is located directly under and contacting the reflective layer in order to improve at least durability of the first surface mirror, and wherein the reflective layer reflects incoming light away from the glass substrate; and wherein the layer comprising silicon aluminum oxide is more oxided at a location closer to the substrate than at a location further from the substrate.

DETAILED DESCRIPTION OF EXAMPLE EMBODIMENTS OF THE INVENTION

The instant invention relates to a mirror that may be used in the context of projection televisions (PTVs), copiers, scanners, bar code readers, overhead projectors, and/or any other suitable applications. In certain embodiments, the mirror is a first surface mirror that includes a silicon metal oxide inclusive nucleation layer (e.g., silicon aluminum oxide) provided above and/or below a reflective layer. The reflective layer 7 (e.g., Al, Ag, Cr, Au and/or the like) may be covered by at least one dielectric layer(s) such as $SiO_2$ and/or $TiO_2$ or any other suitable dielectric material.

Figure 2:
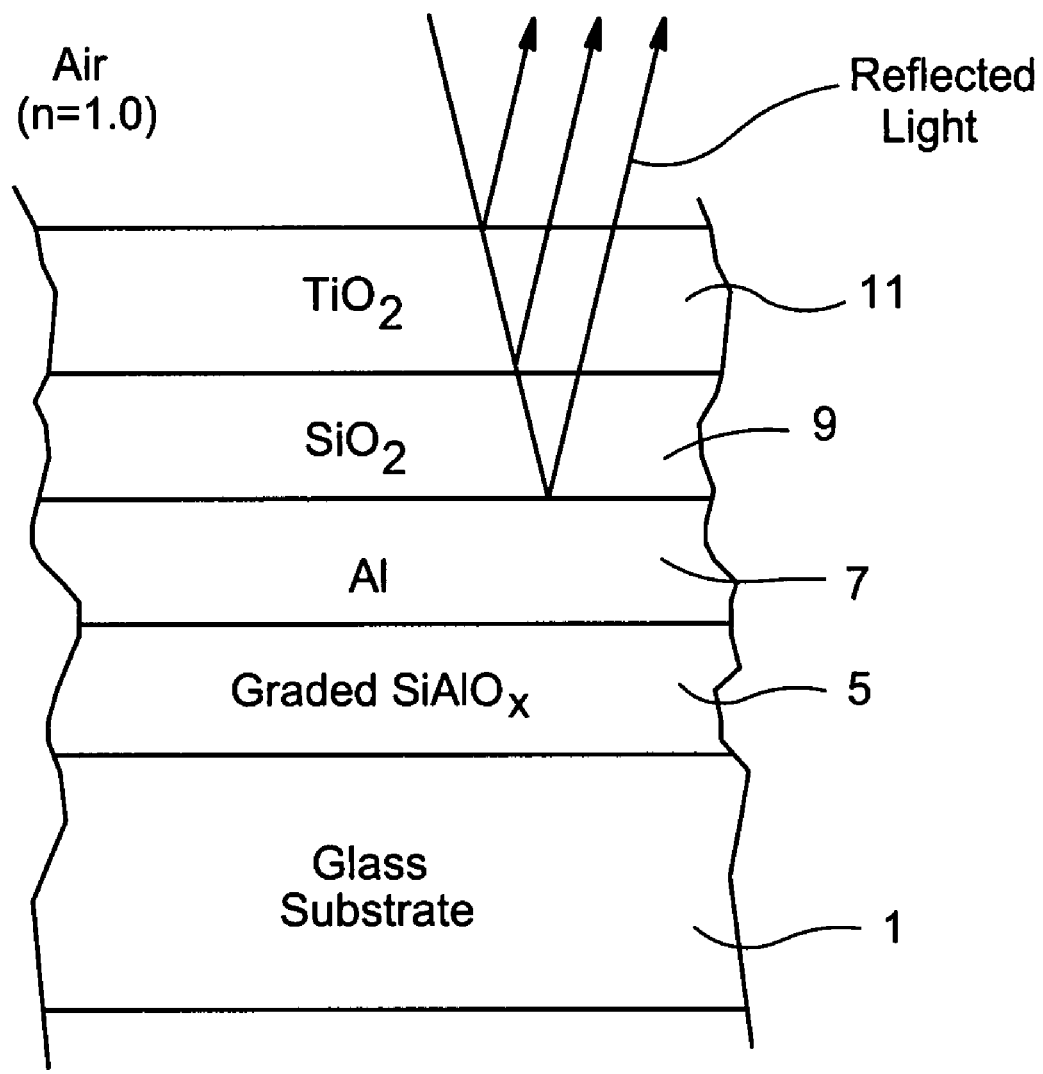
FIG. 2 is a cross sectional view of a first surface mirror according to an example embodiment of this invention.
Figure 3:
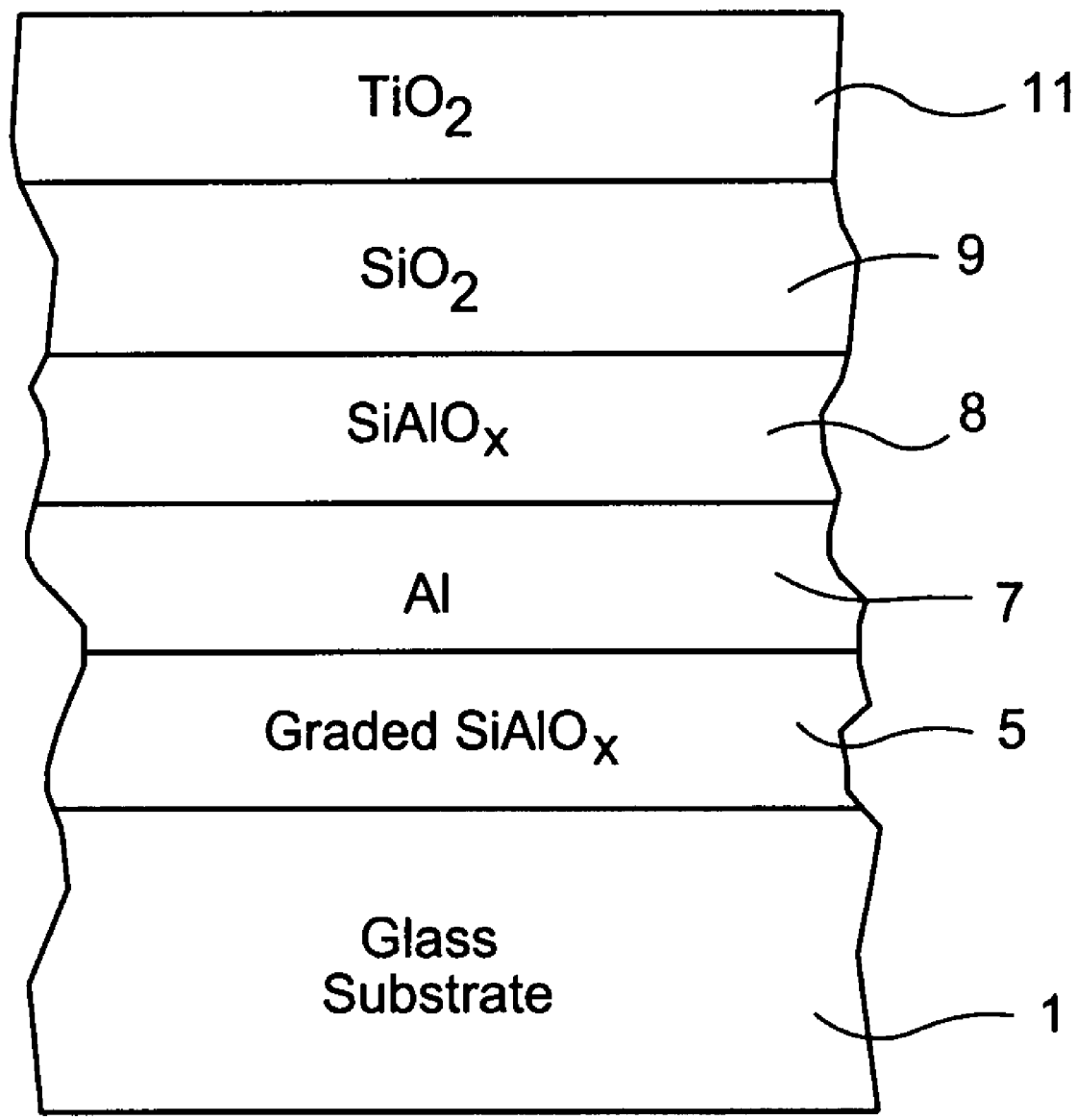
FIG. 3 is a cross sectional view of a first surface mirror according to another example embodiment of this invention.

FIG. 2 is a cross sectional view of a first surface mirror according to an example embodiment of this invention, whereas FIG. 3 is a cross sectional view of a first surface mirror according to another example embodiment of this invention. Instead of a sharp interface between the reflective layer 7 and the substrate (e.g., glass substrate) 1, a bonding or nucleation layer 5 is provided between the reflective layer 7 and the glass or plastic substrate 1. The bonding or nucleation layer 5 may be of or include elements from both the reflective layer 7 (e.g., Al or the like) and the substrate (e.g., silicon oxide or the like), to order to mitigate the sharp interface between the substrate and reflective layer. In certain example instances, the transition can be further smeared by having the composition of the nucleation layer 5 change so as to be graded (e.g., continuously or non-continuously), so that the nucleation layer 5 is rich in the reflective element (e.g., Al or the like) close to the reflective layer 7 and rich in the substrate element(s) (e.g., an oxide of silicon or the like) close to the substrate. Thus, the nucleation layer 5 may be both oxidation graded and metal graded, so that both the metal (e.g., Al) content and the oxide content changes (continuously or non-continuously) throughout the layer 5 between the substrate 1 and the reflective layer 7.

In certain embodiments of this invention, a silicon metal oxide (e.g., silicon aluminum oxide) inclusive nucleation layer 5 is provided under the reflective layer (e.g., Al layer) 7. It has surprisingly been found that providing such a nucleation layer immediately under and contacting the reflecting layer significantly improves durability of the resulting first surface mirror, and the overall optical performance of the mirror. The silicon metal oxide inclusive layer 5 is a good nucleation layer for the reflective material such as aluminum (Al) when the substrate 1 is of glass, because the nucleation layer 5 is made up of a mixture of materials from the glass (e.g., silicon oxide) and the reflective layer (e.g., Al). The nucleation layer may be of other materials in other example embodiments of this invention. For example, if the reflective layer 7 is of Cr, the nucleation layer 5 may be of silicon chromium oxide; and if the reflective layer 7 is of Ag the nucleation layer 5 may be of silicon silver oxide. In certain example embodiments, the metal (e.g., Al) in the silicon metal oxide nucleation layer 5 is the same metal as in the reflective layer 7, thereby improving durability. Moreover, it is noted that such a silicon metal oxide inclusive nucleation layer 5 may be provided above and/or below the reflective layer 7 in certain embodiments of this invention to improve adhesion above and/or below the reflective layer.

In certain example embodiments of this invention, such first surface mirrors may be used in projection televisions, copiers, scanners, bar code readers, vehicle mirrors, overhead projectors, and/or any other suitable applications.

FIG. 2 is a cross sectional view of a first surface mirror according to an example embodiment of this invention. The first surface mirror of FIG. 2 includes glass substrate 1, silicon metal oxide nucleation layer 5, reflective layer 7, dielectric layer 9 and dielectric overcoat layer 11. Glass substrate 1 may be from about 1-10 mm thick in different embodiments of this invention, and may be any suitable color (e.g., grey, clear, green, blue, etc.). In certain example instances, glass (e.g., soda lime silica type glass) substrate 1 is from about 1-5 mm thick, most preferably about 3 mm thick. When substrate 1 is glass, it may have an index of refraction value "n" of from about 1.48 to 1.53 (most preferably about 1.51 to 1.52).

Reflective layer 7 may be of or include Al or any other suitable reflective material in certain embodiments of this invention. Reflective layer 7 reflects the majority of incoming light before it reaches glass substrate 1 and directs it toward a viewer away from the glass substrate, so that the mirror is referred to as a first surface mirror. In certain embodiments, reflective layer 7 has an index of refraction value "n" (at 550 nm) of from about 0.05 to 1.5, more preferably from about 0.05 to 1.0. When layer 7 is of Al, the index of refraction "n" of the layer 7 may be about 0.8 to 0.9, but it also may be as low as about 0.1 when the layer 7 is of Ag. In certain example embodiments of this invention, the metallic layer 7 of Al may be sputtered onto the substrate 1 using a C-MAG rotatable cathode Al inclusive target (may or may not be doped) and/or a substantially pure Al target (>=99.5% Al) (e.g., using 2 C-MAG targets, Ar gas flow, DC, AC or RF power supply, and pressure of 3 mTorr or any other suitable parameter(s)), although other methods of deposition for layer 7 may be used in different instances. For example, planar target(s) may also be used. In sputtering embodiments, the target(s) used for sputtering Al layer 7 may include other materials in certain instances (e.g., from 0-5% Si). Reflective layer 7 in certain embodiments of this invention has an averaged (p- and/or s-polarization in certain instances) reflectance of at least 75% in the 550 nm region as measured on a Perkin Elmer Lambda 900 or equivalent spectrophotometer, more preferably at least 80% at any incident angle. Moreover, in certain embodiments of this invention, reflective layer 7 is not completely opaque, as it may have a small transmission in the aforesaid wavelength region of from 0.1 to 10%, more preferably from about 0.5 to 1.5%. Reflective layer 7 may be from about 10-150 nm thick in certain embodiments of this invention, more preferably from about 20-90 nm thick, even more preferably from about 25-60 nm thick, or from about 30-50 nm thick, with an example thickness being about 45 nm when Al is used for layer 7. Example materials for reflective layer 7 include metallic Al; Al—Cr alloy; and/or Al 6000 Series alloy (includes mostly Al, and also some Cr, Cu, and possibly small amounts of Fe, Mg, Mn, Si, Ti and/or Zn). In certain example embodiments, reflective layer 7 has a reflectivity of visible light of at least about 60%, more preferably of at least about 70%, and most preferably of at least about 80% or 90%.

Dielectric layers 9 and 11 may be made of any suitable material, although in certain example embodiments of this invention dielectric layer 9 is of or includes silicon oxide (e.g., $SiO_2$, or other suitable stoichiometry) and layer 11 is of or includes titanium oxide (e.g., $TiO_2$, or other suitable stoichiometry). Other dielectric materials may instead be used. An example thickness for low-index dielectric layer 9 is from about 50 to 150 nm, more preferably from about 75-95 nm; and an example thickness for high-index dielectric layer 11 is from about 20 to 150 nm, more preferably from about 30-60 nm, and most preferably from about 35-45 nm.

In certain example embodiments of this invention, dielectric layer 11 has a higher index of refraction "n" than does dielectric layer 9; and layer 9 has a higher index of refraction "n" than does reflective layer 7. In certain example embodiments, layer 11 has an index of refraction "n" of from about 2.2 to 2.6, more preferably from about 2.3 to 2.5; dielectric layer 9 has an index "n" of from about 1.4 to 1.8, more preferably from about 1.4 to 1.6; and layer 7 has an index "n" of from about 0.1 to 1.2, more preferably from about 0.7 to 1.0.

Figure 1:
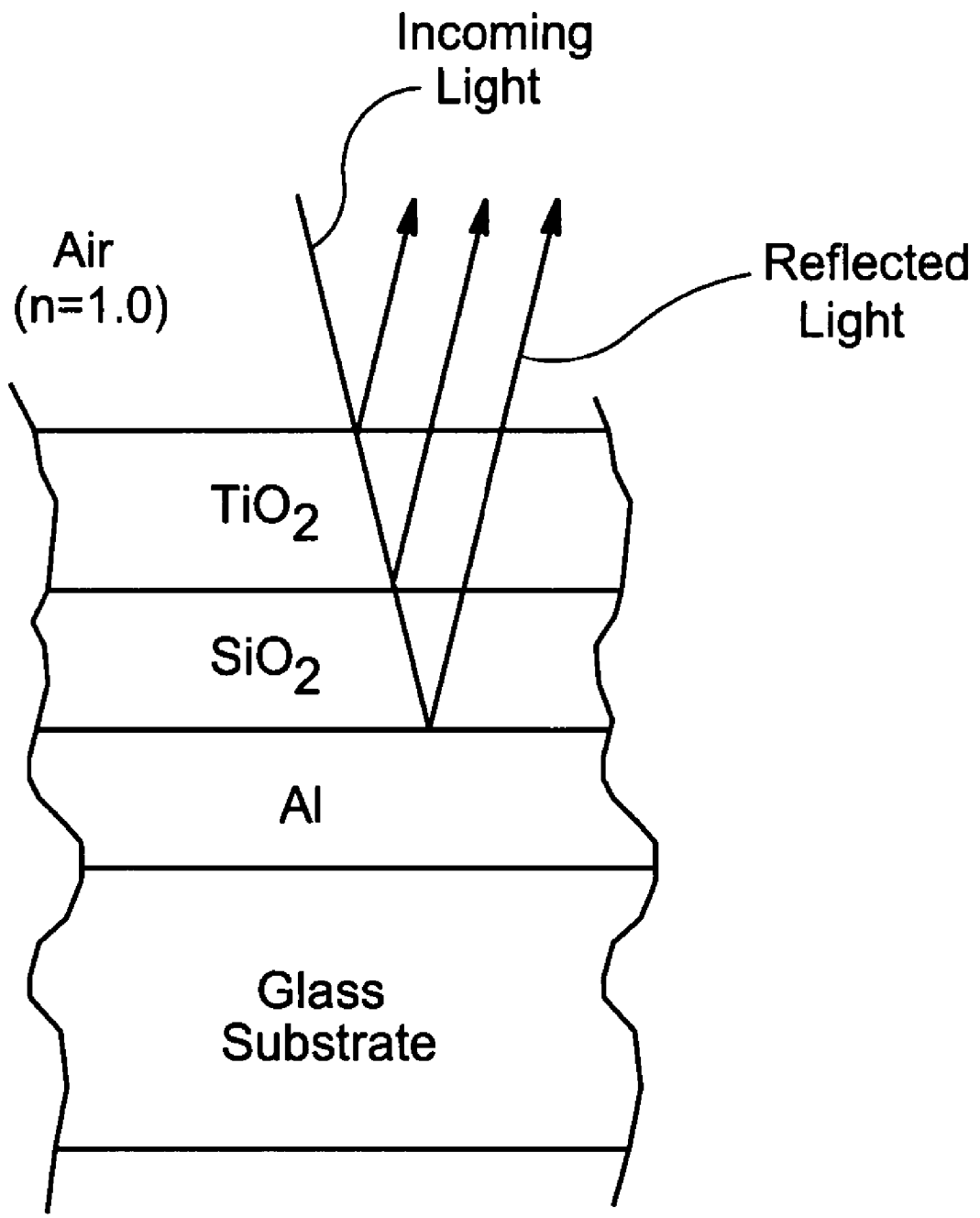
FIG. 1 is a cross sectional view of a conventional first surface mirror.

Surprisingly, it has been found that providing a silicon aluminum oxide inclusive nucleation layer 5 immediately under and contacting the Al reflective layer 7 allows for the durability of the resulting mirror to be significantly improved. In particular, the aforesaid durability problems of the FIG. 1 prior art can be greatly reduced by providing such a layer 5 under the reflective layer 7. The silicon aluminum oxide nucleation layer 5 is a good nucleation layer for the reflective material such as aluminum (Al) of layer 7, and also adheres well to glass and can tolerate imperfect cleanliness on the glass surface. The introduction of the silicon aluminum oxide nucleation layer 5 between the reflective metal 7 and the glass substrate 1 promotes better adhesion without the trade-off of significant corrosion problems in certain example embodiments of this invention.

Since the silicon metal oxide nucleation layer (e.g., of any suitable stoichiometry, including substantially fully stoichiometric or substoichiometric) 5 contains a primary metal (e.g., Al) which is the same as the primary metal of the reflective layer 7 and may also include silicon oxide which is a major component of an optional glass substrate 1, no new materials are needed and the common materials used improves bonding and durability. Moreover, potential corrosion caused by free energy difference between different metals is reduced and/or eliminated, so that adhesion can be improved. In particular, adhesion is improved as both the bonding between layer 5 and glass 1, and layer 5 and layer 7, is strong due to similarities of compositional elements. Thus, improved durability results.

In certain example embodiments of this invention, at least a portion of the silicon metal oxide nucleation layer 5 has in index of refraction (n) of from about 0.5 to 2, more preferably from 0.8 to 1.7, even more preferably from about 1.2 to 1.6.

In certain example embodiments of this invention, the nucleation layer 5 of or including silicon aluminum oxide may be uniformly oxided and/or in composition substantially throughout its entire thickness. However, in other example embodiments of this invention, the nucleation layer 5 of or including silicon aluminum oxide may be oxidation and metal-composition graded, continuously or discontinuously, through its thickness.

Oxidation graded means that the level of oxygen changes at different points in the layer 5 thickness, whereas metal-composition graded means that the metal content (e.g., Al content) changes at different points in the layer thickness. In metal-composition graded embodiments, the Al (or other metal M) ratio or amount should be higher at the location closer to the Al reflective layer 7, and lower at the location closer to the substrate 1 and further from the reflective layer. In a similar manner, in metal-composition graded embodiments, the Si (or silicon oxide) ratio or amount should be higher at the location closer to the glass substrate 1, and lower at the location closer to the reflective layer 7 and further from the glass substrate 1.

Accordingly, it will be appreciated that in certain example embodiments of this invention, a silicon aluminum oxide nucleation layer 5 may be graded in three respects. First, the silicon aluminum oxide nucleation layer 5 may be oxidation graded (continuously or discontinuously) so that the oxygen or oxide content is higher at a location close to the glass substrate 1 and lower at another location in the silicon aluminum oxide layer 5 closer to the reflective layer 7. Second, the silicon aluminum oxide nucleation layer 5 may be metal (e.g., Al) graded (continuously or discontinuously) so that the metal (e.g., Al) content of the layer 5 is higher at a location close to the metal or substantially metal reflective layer 7, and lower at another location in the silicon aluminum oxide layer 5 closer to the substrate 1. Third, the silicon aluminum oxide nucleation layer 5 may be silicon (Si) graded (continuously or discontinuously) so that the Si content of the layer 5 is higher at a location close to the glass substrate 1 and lower at another location in the silicon aluminum oxide layer 5 closer to the reflective layer 7. These oxidation/composition gradings of nucleation layer 5 may be continuously progressive in a linear manner in certain example embodiments, or alternatively may be step-like or otherwise discontinuous in other example embodiments. In certain example embodiments, the oxidation/composition graded nucleation layer 5 may be substantially fully oxided immediately adjacent to the glass substrate 1 and substantially metallic or much more metallic immediately adjacent to the reflective layer 7.

In an inline sputter deposition facility for example, the oxidation/composition graded nucleation layer 5 may be formed by biased reactive gas feeding, by codeposition of two adjacent sputtering targets having different compositions and/or gas flows, or by the combination of both techniques in certain example instances.

The FIG. 3 embodiment is similar to the FIG. 2 embodiment discussed above, except that an additional silicon aluminum oxide layer 8 is provided above the reflective layer so as to be located between the reflective layer 7 and the dielectric layer 9. Given a silicon metal oxide (e.g., silicon aluminum oxide) without significant absorption loss in a desired spectrum range, such an upper nucleation layer 8 (uniformly oxided, or oxidation and/or composition graded as discussed above in connection with layer 5) can be introduced above the reflective layer 7 so as to be located between the reflective layer 7 and the dielectric overcoat in order to improve adhesion therebetween. Again, since the silicon metal oxide nucleation layer 8 contains a primary metal (e.g., Al) which is the same as the primary metal of the reflective layer 7, no new material needs to be introduced into the fabrication. Adhesion is improved as both the bonding between layer 8 and layer 9, and layer 8 and layer 7, is strong due to similarities of compositional elements given that the same primary metal (e.g., Al) is used in both the reflective layer 7 and the upper nucleation layer 8. Thus, improved durability results. When the upper nucleation layer is oxidation and/or composition graded, the layer 8 is more oxided at a location therein closer to the overcoat dielectric than at a location therein closer to the metal reflective layer 7; and the Al content may be higher closer to the Al reflective layer 7 than farther from the layer 7; and the Si content may be higher closer to silicon inclusive dielectric layer 9. This is advantageous for the reasons discussed above.

In certain example embodiments of this invention, each of the nucleation layers 5 and/or 8 may be from about 5-100 nm thick, more preferably from about 5 to 50 nm thick, or from about 5 to 30 nm thick.

In certain example embodiments of this invention, when silicon aluminum oxide is used as or in the nucleation layer 5, the layer 5 may include, on an atomic basis: (a) from about 0-67% oxygen, more preferably from about 2-67% oxygen, even more preferably from about 2-50% oxygen, even more preferably from about 2-40% oxygen, even more preferably from about 2-30% oxygen, even more preferably from about 5-20% oxygen; (b) from about 33-100% Si and Al together, even more preferably from about 33-98% Si and Al together, even more preferably from about 70-98% Si and Al together, and most preferably from about 80-95% Si and Al together; (c) from about 33-99% Si, more preferably from about 70-98% Si, and most preferably from about 80-95% Si; and (d) an Si/Al ratio of from about 0.05 to 100, more preferably from about 0.05 to 1.5, and most preferably from about 0.6 to 1.5.

Figure 4:
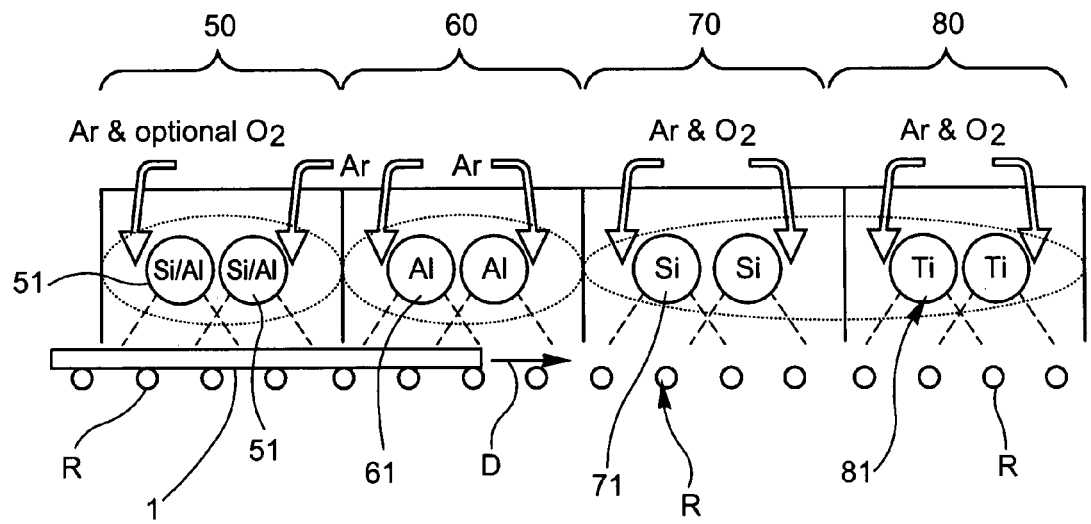
FIG. 4 is a schematic diagram of an apparatus used in making a mirror according to the FIG. 2 and/or FIG. 3 embodiment(s) of this invention.
Figure 5:
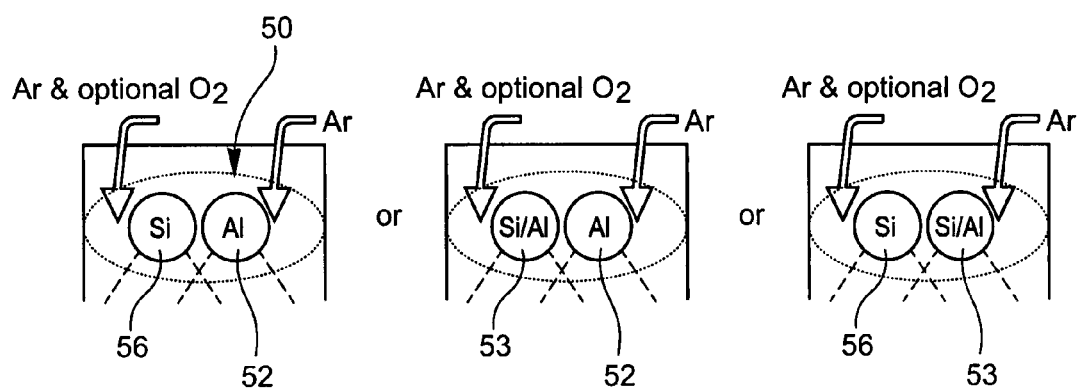
FIG. 5 is a schematic diagram of three possible alternative sputtering chambers which may be used to replace the first sputtering chamber in the FIG. 4 apparatus, according to alternative example embodiments of this invention.

FIGS. 4-5 illustrate different systems which may be used to form the layers of example embodiments of this invention via sputtering in a vacuum sputtering in-line coater for example. In FIG. 4, the glass substrate 1 moves in direction D on rollers R under the sputtering targets of the coater. The nucleation layer 5 in the FIG. 4 embodiment is formed using sputtering chamber 50, the reflective layer 7 is formed using sputtering chamber 60, the dielectric layer 9 (e.g., of or including silicon oxide) is formed using sputtering chamber 70, and the dielectric layer 11 (of or including titanium oxide) is formed using sputtering chamber 80.

Referring to FIG. 4, the nucleation or bonding layer 5 may be fabricated in certain example embodiments using an alloy sputtering target(s) 51 including elements (e.g., Si and Al in FIG. 4) of both the reflective metal layer 7 and the substrate 1. In the FIG. 4 embodiment, oxidation grading of layer 5 is achieved by introducing more oxygen gas into the sputtering chamber 50 at a location close to the beginning of the chamber (along with Ar gas in certain instances), and less or no oxygen gas into the chamber 50 at a location closer to the end of the chamber adjacent chamber 60 (Ar gas may be introduced in both locations in certain instances, as shown in FIG. 4). In the FIG. 4 embodiment, the layer 5 need not be Si or Al graded. After the layer 5 has been deposited using sputtering chamber 50, the glass moves on in direction D and chamber 60 sputter-deposits the Al reflective layer using Al sputtering targets 61, chamber 70 sputter-deposits dielectric layer 9 using Si or Si/Al sputtering targets 71, and chamber 80 sputter-deposits dielectric layer 11 using Ti or TiOx sputtering target(s) 81.

FIG. 5 illustrates three alternative ways in which to sputter-deposit a composition and/or oxidation graded nucleation layer 5. In other words, one, two or all three of the sputtering chambers shown in FIG. 5 may be used to replace the chamber 50 in FIG. 4, in different example embodiments of this invention.

In the first alternative embodiment shown in FIG. 5 (leftmost embodiment in FIG. 5), a Si target 56 and an Al target 52 are used in chamber 50 to sputter-deposit a composition graded nucleation layer 5. The glass substrate 1 first passes under Si target 56 with oxygen and argon gas proximate thereto so that mainly $SiO_2$ (possibly doped with Al or the like) is deposited directly on the glass 1 to start forming layer 5. Then, the glass substrate 1 proceeds to a position under Al target 52 with argon (and possibly oxygen gas) proximate thereto so that mainly Al or Al oxide (possibly doped with Si or the like) is deposited as the top portion of layer 5 so as to be adjacent the reflective layer 7. Si and Al grading in layer 5 are achieved by the positioning of Si target 56 and Al target 52 as shown in the left example of FIG. 5, so that the Si content is highest closest to the substrate 1 and lower at higher locations in layer 5, and the Al content is highest close to reflective layer 7 and lower at lower locations in layer 5. Oxidation grading may be achieved in this embodiment by introducing more oxygen gas into the area proximate Si target 56 than proximate Al target 52. Thus, the layer 5 formed in this example embodiment may be graded in two or three different respects as explained herein (Si graded, Al graded, and/or oxide graded).

In the second alternative embodiment shown in FIG. 5 (middle embodiment of FIG. 5), a SiAl target 53 and an Al target 52 are used in chamber 50 to sputter-deposit a composition graded nucleation layer 5. The glass substrate 1 first passes under SiAl target 53 with oxygen and argon gas proximate thereto so that mainly $SiO_2$ doped with Al is deposited directly on the glass 1 to start forming layer 5. Then, the glass substrate 1 proceeds to a position under Al target 52 with argon (and possibly oxygen gas) proximate thereto so that mainly Al or Al oxide (possibly doped with Si or the like) is deposited as the top portion of nucleation layer 5 so as to be adjacent the reflective layer 7. Si and Al grading in layer 5 are achieved in this embodiment by the positioning of SiAl target 53 and Al target 52 as shown in the middle embodiment of FIG. 5, so that the Si content is highest closest to the substrate 1 and lower at higher locations in layer 5 proximate the reflective layer 7, and the Al content is highest close to reflective layer 7 and lower at lower locations in layer 5 proximate the substrate 1. Oxidation grading may also be achieved in this embodiment by introducing more oxygen gas into the area proximate SiAl target 53 than proximate Al target 52 (little or no oxygen gas may be introduced at the right hand side of the chamber). Thus, the layer 5 formed in this example embodiment may be graded in two or three different respects as explained herein (Si graded, Al graded, and/or oxide graded).

In the third alternative embodiment shown in FIG. 5 (leftmost embodiment of FIG. 5), a Si target 56 and a SiAl target 53 are used in chamber 50 to sputter-deposit a composition graded nucleation layer 5. The glass substrate 1 first passes under Si target 56 with oxygen and argon gas proximate thereto so that mainly $SiO_2$ (possibly doped with Al) is deposited directly on the glass 1 to start forming layer 5. Then, the glass substrate 1 proceeds to a position under SiAl target 53 with argon (and possibly oxygen gas) proximate thereto so that mainly Al or Al oxide with a smaller portion of Si therein is deposited as the top portion of nucleation layer 5 so as to be adjacent the reflective layer 7. Si and Al grading in layer 5 are achieved in this embodiment by the positioning of Si target 56 and SiAl target 53 as shown in the right-hand embodiment of FIG. 5, so that the Si content is highest closest to the substrate 1 and lower at higher locations in layer 5 proximate the reflective layer 7, and the Al content is highest close to reflective layer 7 and lower at lower locations in layer 5 proximate the substrate 1. Oxidation grading may also optionally be achieved in this embodiment by introducing more oxygen gas into the area proximate Si target 56 than proximate SiAl target 53. Thus, the layer 5 formed in this example embodiment may be graded in two or three different respects as explained herein (Si graded, Al graded, and/or oxide graded).

Figure 6:
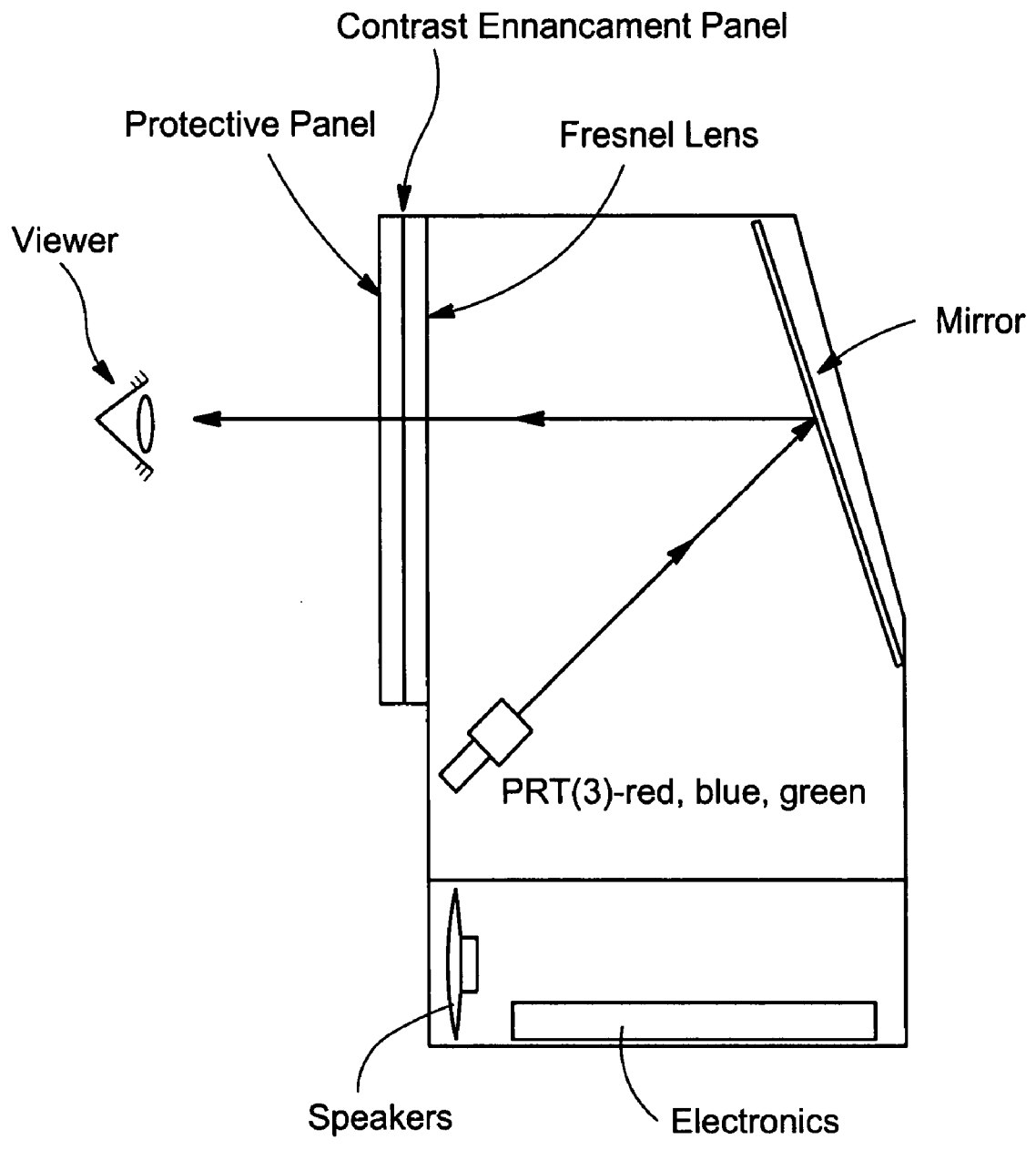
FIG. 6 is a schematic diagram illustrating a first surface mirror according to an example embodiment of this invention being used in the context of a projection television apparatus.

FIG. 6 is a schematic diagram illustrating the mirror of any of the embodiments discussed herein being used in the context of a projection television (PTV). Light is directed toward and reflected by the mirror which in turn directs the light toward a Fresnel lens, contrast enhancement panel, and/or protective panel after which it ultimately proceeds to a viewer. The improved features of the mirrors discussed herein enable an improved PTV to be provided.

Those skilled in the art will appreciate that the term "between" as used herein does not mean that a layer between two other layers has to contact the other two layers (i.e., layer A can be "between" layers B and C even if it does not contact layer(s) B and/or C, as other layer(s) can also be provided between layers B and C).

By arranging the respective materials and indices of refraction "n" of the example layers discussed above, it is possible to achieve a scratch and/or corrosion resistant, and thus durable, first surface mirror. Moreover, the first surface mirror may have a visible reflection of at least about 80%, more preferably of at least about 85%, still more preferably of at least 90%, and even at least about 95% in certain embodiments of this invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the coatings discussed herein may in some instances be used in back surface mirror applications, different materials may be used, additional or fewer layers may be provided, and/or the like.

The invention claimed is:

1. A mirror comprising:
 a substrate supporting a coating, wherein the coating includes at least a reflective layer comprising aluminum, first and second dielectric layers, and at least one layer comprising silicon aluminum oxide, wherein the layer comprising silicon aluminum oxide is located closer to the substrate than are the reflective layer and the dielectric layers, and wherein the reflective layer comprising aluminum is located between the substrate and the dielectric layers;
 wherein the layer comprising silicon aluminum oxide is located directly under and contacting the reflective layer comprising aluminum in order to improve at least durability of the first surface mirror; and
 wherein the layer comprising silicon aluminum oxide is graded in at least three different respects so that the layer comprising silicon aluminum oxide (a) contains more oxygen at a location closer to the substrate than at a location further from the substrate; (b) contains more Si at a location closer to the substrate than at a location further from the substrate; and (c) contains more Al at a location closer to the reflective layer than at a location further from the reflective layer.

2. The mirror of claim 1, wherein the mirror is a first surface mirror and is located in a projection television apparatus, and wherein the reflective layer comprising aluminum reflects incoming light away from the substrate.

3. The mirror of claim 1, wherein the layer comprising silicon aluminum oxide comprises from about 2-67% oxygen, from about 33-98% Si and Al together, and an Si/Al ratio of from about 0.05 to 100.

4. The mirror of claim 1, wherein the layer comprising silicon aluminum oxide is in direct contact with both the substrate and the reflective layer comprising aluminum.

5. The mirror of claim 1, wherein the mirror is a first surface mirror and reflects at least about 80% of incoming visible light at about 550 nm.

6. The mirror of claim 1, wherein at least one of the gradings (a)-(c) is a substantially continuously progressive grading through the thickness of the layer comprising silicon aluminum oxide.

7. The mirror of claim 1, wherein two or three of the gradings (a)-(c) are substantially continuously progressive gradings through the thickness of the layer comprising silicon aluminum oxide.

8. The mirror of claim 1, wherein the first dielectric layer comprises silicon oxide and the second dielectric layer comprises titanium oxide.

9. The mirror of claim 1, wherein the first and second dielectric layers are each provided on the substrate over at least the reflective layer, and wherein the second dielectric layer is an outermost layer of the first surface mirror, and wherein the second dielectric layer has an index of refraction value "n" greater than an index of refraction value "n" of the first dielectric layer.

10. The mirror of claim 9, wherein the second dielectric layer has an index of refraction value "n" of from about 2.2 to 2.6, and the first dielectric layer has an index of refraction value "n" of from about 1.4 to 1.6.

11. The mirror of claim 1, wherein the layer comprising silicon aluminum oxide is from about 5 to 50 nm thick.

12. The mirror of claim 1, wherein the substrate comprises soda lime silica based glass.

13. The mirror of claim 1, further comprising another layer comprising aluminum oxide and/or silicon aluminum oxide located above and directly contacting the reflective layer.

14. A first surface mirror comprising:
a substrate supporting a coating, wherein the coating includes at least a reflective layer, first and second dielectric layers, and at least one layer comprising silicon aluminum oxide, wherein the layer comprising silicon aluminum oxide is located closer to the substrate than are the reflective layer and the dielectric layers, and wherein the reflective layer is located between the substrate and the dielectric layers;
wherein the layer comprising silicon aluminum oxide is located directly under and contacting the reflective layer in order to improve at least durability of the first surface mirror; and
wherein the layer comprising silicon aluminum oxide is graded in at least two of the following three different respects: (a) the layer comprising silicon aluminum oxide comprises more oxygen at a location closer to the substrate than at a location further from the substrate; (b) the layer comprising silicon aluminum oxide comprises more Si at a location closer to the substrate than at a location further from the substrate; and (c) the layer comprising silicon aluminum oxide comprises more Al at a location closer to the reflective layer than at a location further from the reflective layer.

15. The first surface mirror of claim 14, wherein the mirror is located in a projection television apparatus, and wherein the reflective layer comprises aluminum and reflects incoming light away from the substrate.

16. The first surface mirror of claim 14, wherein the layer comprising silicon aluminum oxide comprises from about 2-30% oxygen, from about 70-98% Si and Al together, and an Si/Al ratio of from about 0.05 to 1.5.

17. The first surface mirror of claim 14, wherein the layer comprising silicon aluminum oxide is in direct contact with both the substrate and the reflective layer.

18. The first surface mirror of claim 14, wherein the mirror reflects at least about 80% of incoming visible light at about 550 nm.

19. The first surface mirror of claim 14, wherein at least one of the gradings (a)-(c) is a substantially continuously progressive grading through the thickness of the layer comprising silicon aluminum oxide.

20. The first surface mirror of claim 14, wherein the layer comprising silicon aluminum oxide is from about 5 to 50 nm thick.

21. A first surface mirror comprising:
a substrate supporting a coating, wherein the coating includes at least a reflective layer, at least one dielectric layer, and at least one layer comprising silicon aluminum oxide, wherein the layer comprising silicon aluminum oxide is located closer to the substrate than are any of the reflective layer and the dielectric layer, and wherein the reflective layer is located between the substrate and the dielectric layer;
wherein the layer comprising silicon aluminum oxide is located directly under and contacting the reflective layer in order to improve at least durability of the first surface mirror, and wherein the reflective layer reflects incoming light away from the glass substrate; and
wherein the layer comprising silicon aluminum oxide is more oxided at a location closer to the substrate than at a location further from the substrate.

22. The first surface mirror of claim 21, wherein the first surface mirror is located in a projection television apparatus.

23. The first surface mirror of claim 21, wherein the layer comprising silicon aluminum oxide comprises from about 2-30% oxygen, from about 70-98% Si and Al together, and an Si/Al ratio of from about 0.6 to 1.5.

* * * * *